United States Patent [19]

Jefferies et al.

[11] 4,025,919
[45] May 24, 1977

[54] AUTOMATIC TARGET DETECTOR

[75] Inventors: Larry D. Jefferies, Annapolis; George A. Gilmour, Severna Park, both of Md.

[73] Assignee: Westinghouse Electric Corporation, Pittsburgh, Pa.

[22] Filed: Nov. 14, 1975

[21] Appl. No.: 631,973

[52] U.S. Cl. .............................. 343/5 VQ; 340/3 R; 343/5 CM
[51] Int. Cl.² ........................ G01S 9/02; G01S 9/66
[58] Field of Search .......... 343/5 VQ, 5 DP, 5 CM; 340/3 R, 3 F, 3 C

[56] References Cited
UNITED STATES PATENTS

| | | |
|---|---|---|
| 3,683,380 | 8/1972 | Cantwell et al. ................. 343/5 VQ |
| 3,940,762 | 2/1976 | Ethington et al. .............. 343/5 VQ |

*Primary Examiner*—Richard A. Farley
*Attorney, Agent, or Firm*—D. Schron

[57] ABSTRACT

Apparatus which automatically detects targets of interest in line scanned amplitude modulated data systems such as side scan radar or sonar. The apparatus examines a received signal for certain predetermined parameters. On the basis of values of these parameters a probability code is developed which is a measure of the probability that a target is present. The signal which is divided into a corresponding number of range cells, is rewarded if a target like signal occurs within a certain number of resolution cells of the same range on the next signal. If no target like features are present in this zone on the next signal, a penalty is applied.

13 Claims, 16 Drawing Figures

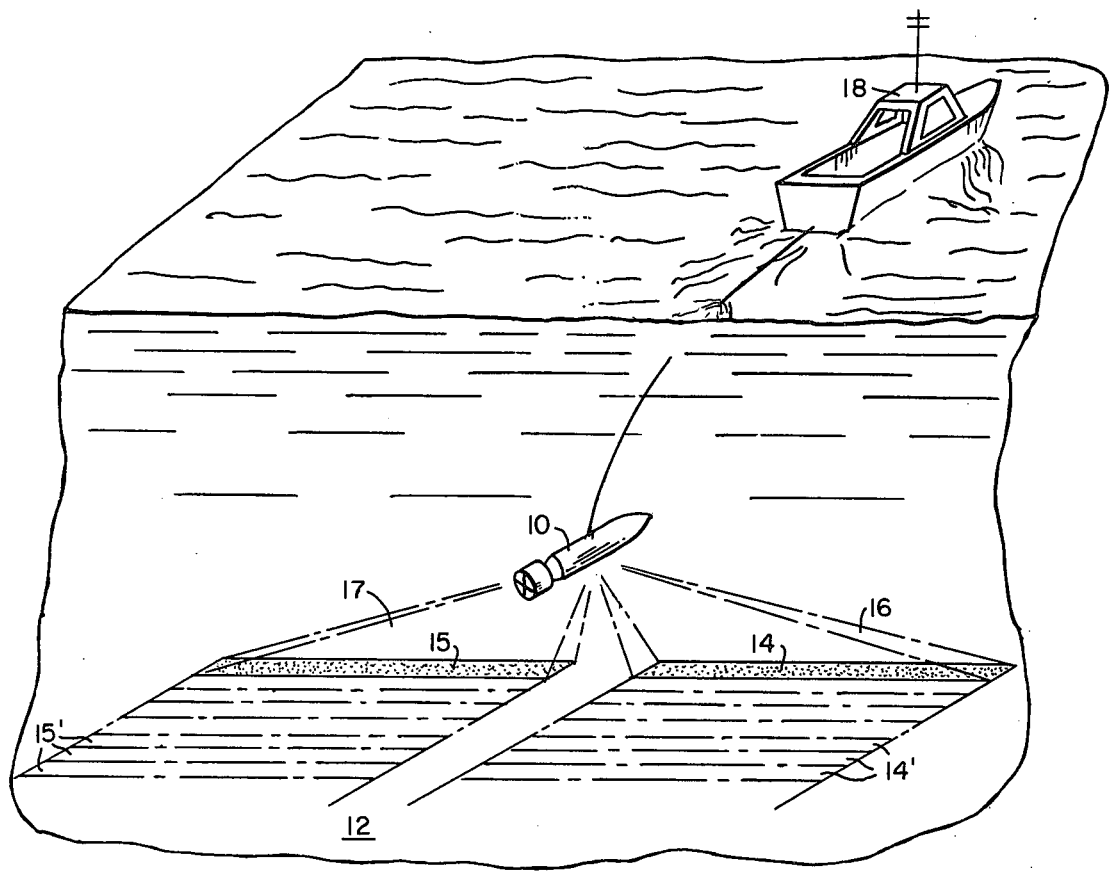
FIG. IA

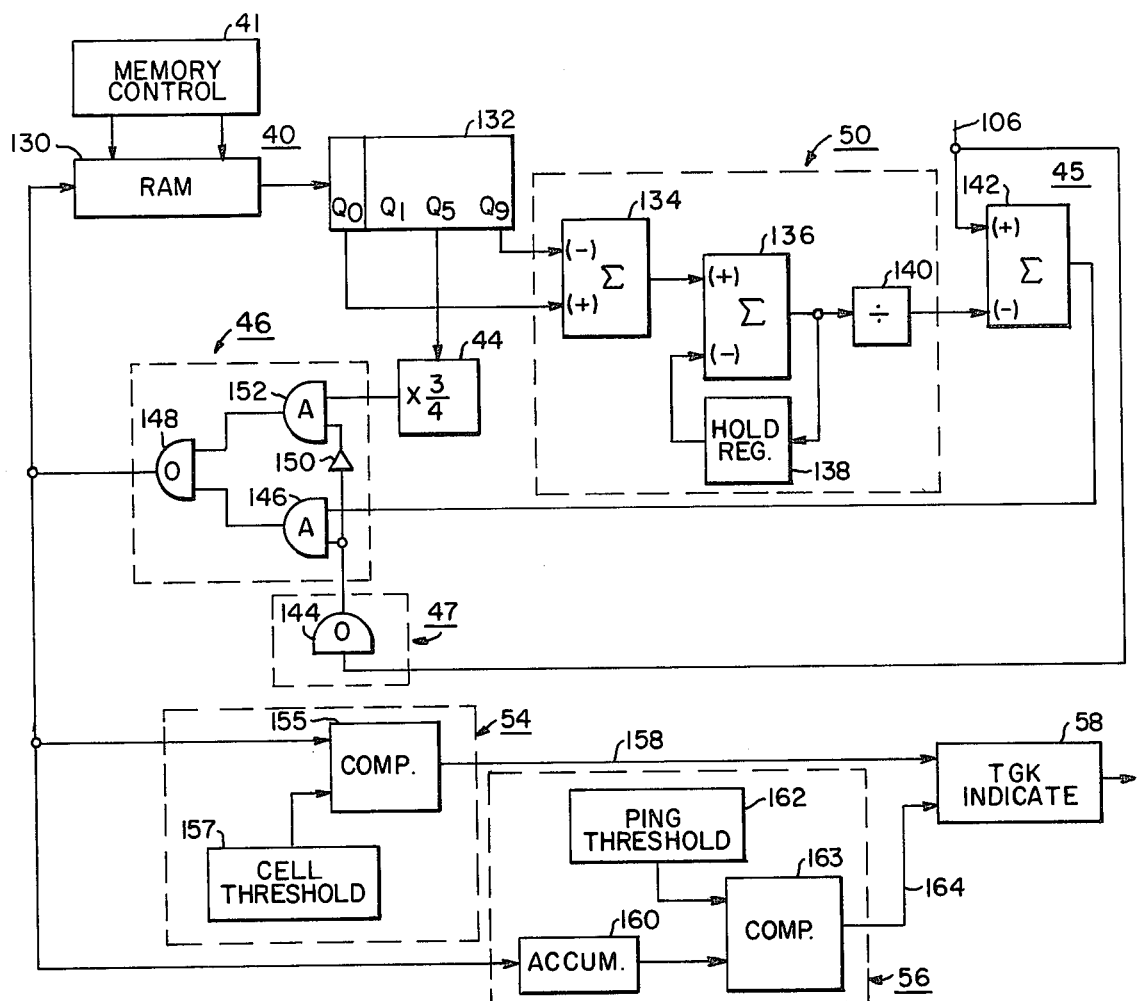
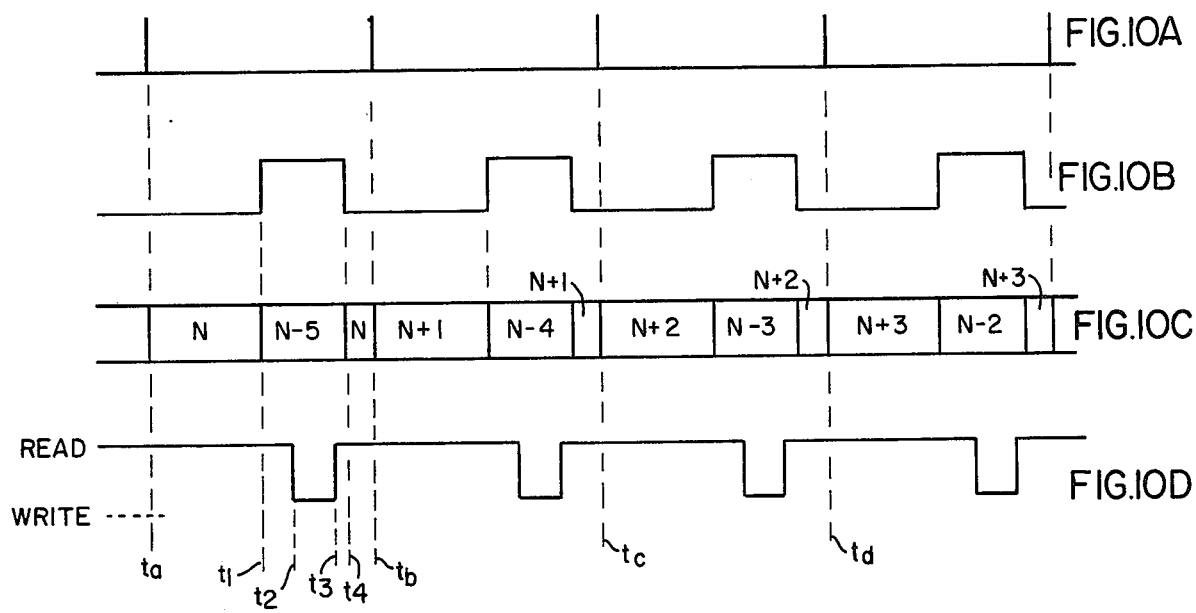
FIG. 9
FIG. 10A
FIG. 10B
FIG. 10C
FIG. 10D

AUTOMATIC TARGET DETECTOR

BACKGROUND OF THE INVENTION

1. Field of the Invention

The invention in general relates to automatic target detection apparatus, and particularly to such apparatus for use in side looking sonar or radar systems.

2. Description of the Prior Art

In side scan or side looking energy systems, a carrier traveling over the target area repetitively transmits pulses of energy to illuminate the target area and energy reflected from narrow adjacent strips on the target area is portrayed as a line-by-line picture that is a pattern of highlights and shadows analogous to an optically viewed panorama illuminated by side lighting, with objects outlined in such a way as to permit their identification.

Such apparatus may be used, for example, for military missions, scientific observations, geological surveys, or inspection purposes to name a few.

For various missions, an operator must continuously view the displayed picture so as to locate possible targets of interest. During the course of a relatively long mission, and due to the relative difficulty of picking out a target in some displays, the viewer often can miss the accurate determination of targets of interest.

SUMMARY OF THE INVENTION

In commonly assigned copending application Ser. No. 637,999 filed Dec. 5, 1975 an automatic target detector is disclosed which examines a plurality of repetitive line scanned signals indicative of a target area of interest for signal levels above a first predetermined threshold (highlight) and below a second predetermined threshold (shadow) and if the combination is present in a predetermined number of signals, a possible target will be indicated. In the present invention means are provided for examining such signals for determining the presence of certain predetermined parameters and providing a weighted output signal dependent upon the number of parameters present. A storage means stores the results of the examination and the stored results are either increased or decreased depending upon the weighted output signals from a subsequent examination.

In one embodiment, the signals are divided into corresponding range cells with the information from each range cell being stored in a corresponding location in memory and then changed on the basis of the range cell information developed from a next signal. If the weighted output signal is zero for a range cell, meaning there is no change that a target is present in that range cell, the stored number in memory for that range cell is penalized by decreasing its value. If the weighted output signal has a value other than zero then the value of the memory is increased by some predetermined function and thus the memory builds up as the signal to signal correlation increases. A threshold is set on each range cell value such that when the threshold is exceeded a possible target will be indicated.

BRIEF DESCRIPTION OF THE DRAWINGS

FIGS. 1A and 1B illustrate respectively single beam and multi-beam side looking sonar systems;

FIG. 9 is a block diagram illustrating a portion of FIG. 4 in more detail; and

FIGS. 10A through 10D are waveforms and timing diagrams for the operation of the memory illustrated in FIG. 4.

DESCRIPTION OF THE PREFERRED EMBODIMENT

Figure 1B:
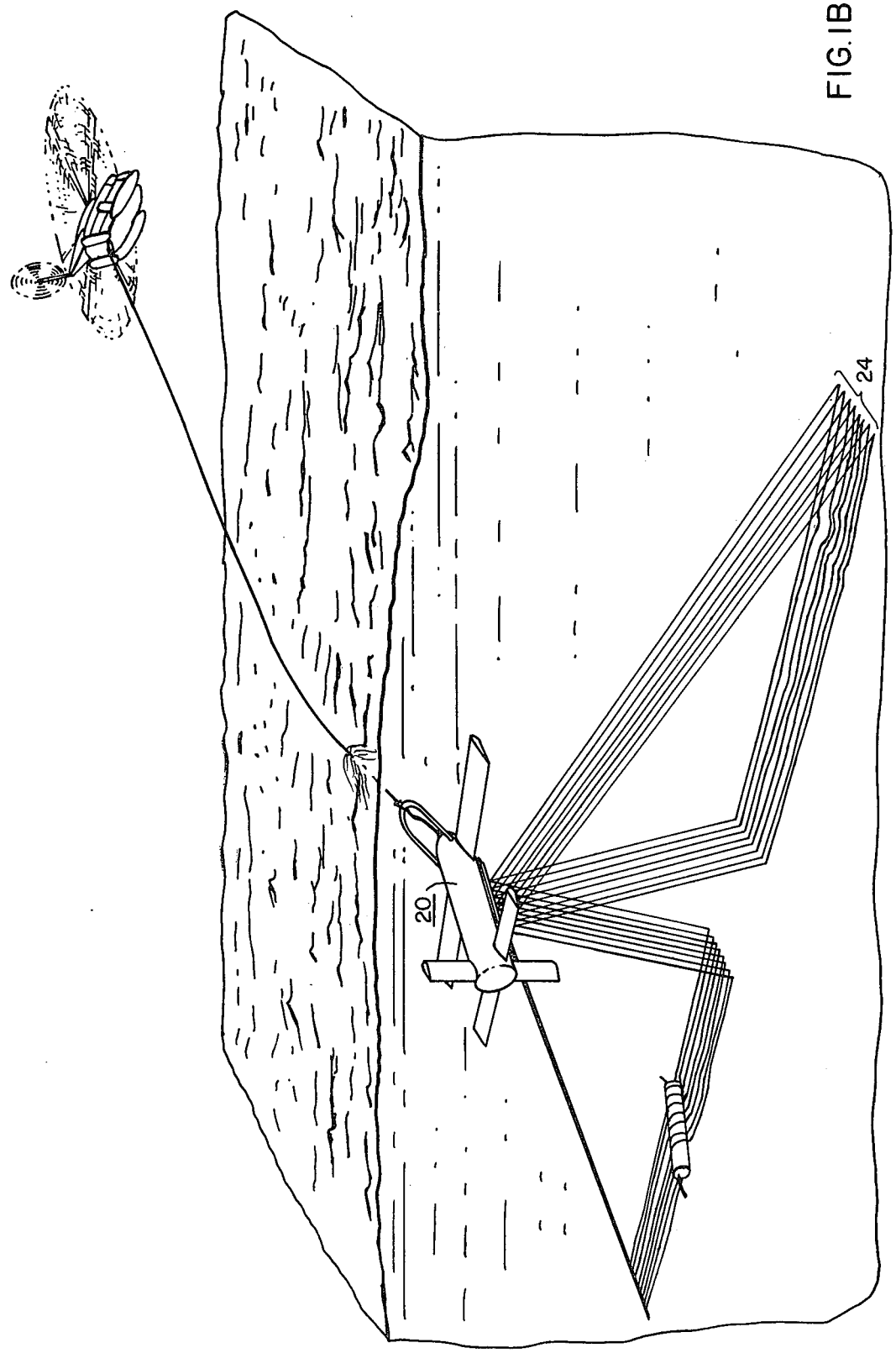

Although the invention is applicable to various types of sensor systems providing line scanned amplitude modulated signals indicative of a target area of interest, it will be described with respect to a side looking sonar system one example of which is illustrated in FIG. 1A. Side looking sonar transducers mounted on carrier 10 periodically transmit acoustic energy pulses in a certain pattern such that the sound energy impinges upon the bottom 12 and scans, or sweeps out elongated narrow insonified strips 14 and 15 produced by starboard and port transducers respectively. The apparatus forms relatively narrow starboard and port receiver beams 16 an 17 whereby reflected acoustic energy from strips 14 and 15 containing information relative to the bottom, or targets on the bottom, is picked up by receiving transducers and processed and displayed.

The carrier 10 may be towed through the water by means of a surface vessel 18 or the apparatus may be mounted directly on an undersea vehicle. As the carrier proceeds along a course line, multiple sequential acoustic transmissions (pings) take place such that multiple adjacent areas 14', 15', on the bottom are insonified. Areas 14 and 15 represent the strip presently being insonified whereas the strips 14' and 15' represent previously insonified strips from which information has been received. That is, each return signal contains information, and collectively the return signals are indicative of a sound picture of the target area over which the apparatus travels.

FIG. 1A illustrates, with respect to one side of the carrier, a single beam system. In order to increase the area covered per unit of time, use is made of a multibeam system such as illustrated in FIG. 1B wherein the carrier 20 may be towed by a relatively fast surface vessel or as illustrated, by a helicopter 22. With the multi-beam system, a single pulse insonifies a portion of the target area slightly greater than the area covered by the multiple receiver beams 24. The informational content of each beam may then be treated in the same manner as the single beam system, for display purposes.

Figure 2A:
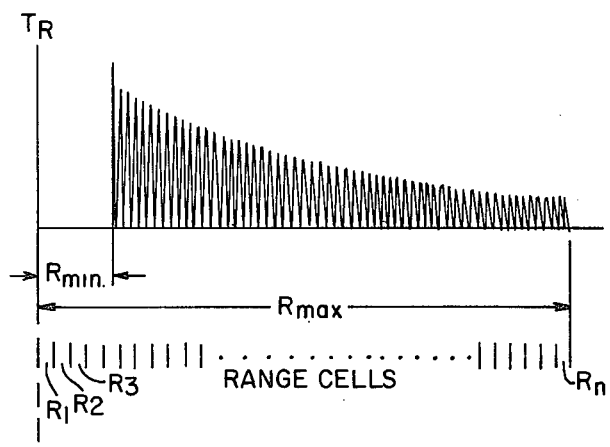
FIGS. 2A to 2C illustrate idealized side looking sonar signals.

FIG. 2A represents an idealized side looking sonar signal in the absence of a target. Signal amplitude is plotted on the vertical axis and range is plotted on the horizontal axis, also representing time. In FIG. 2A it is seen that after an acoustic transmission takes place at $T_R$, the signal is presented from a certain minimum range of interest $R_{min}$ out to a maximum range of interest $R_{max}$ with the signal starting at a maximum and decreasing thereafter as a function of range. The slant range is divided up into units or range cells designated $R_t$ to $R_n$.

Figure 2B:
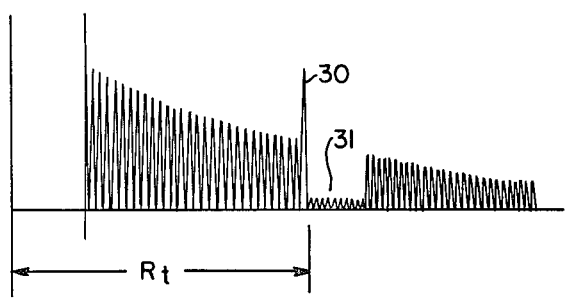

FIG. 2B illustrates the same signal with a target present at range $R_t$, the target being indicated by the signal highlight 30 followed by a shadow portion 31 where no signal is present.

Most side looking sonar displays include time varying gain apparatus which normalizes the signal so that a relatively smooth bottom produces a uniform intensity on the display from the minimum to maximum range of interest.

Figure 2C:
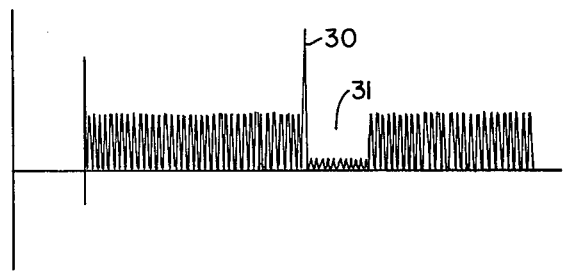

FIG. 2C, therefore, illustrates the side looking sonar signal of 2B with time varying gain applied, resulting in a normalized signal.

Figure 3:
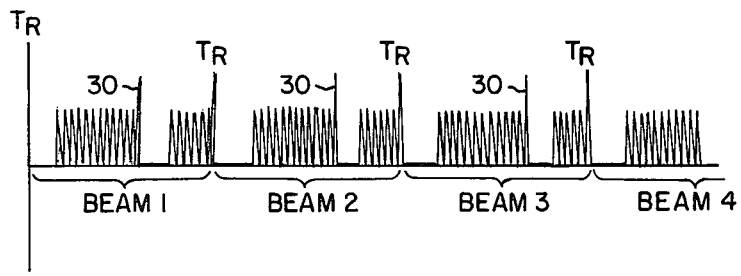
FIG. 3 illustrates idealized side looking sonar signals for a multi-beam system such as in FIG. 1B.

For the multi-beam case of FIG. 1B, the signal associated with each beam may be scan converted and presented one at a time as if produced by sequential pings, as illustrated in FIG. 3. The automatic target detector operates on the sequential beams exactly as on a single beam sonar but at a faster rate.

Figure 4:
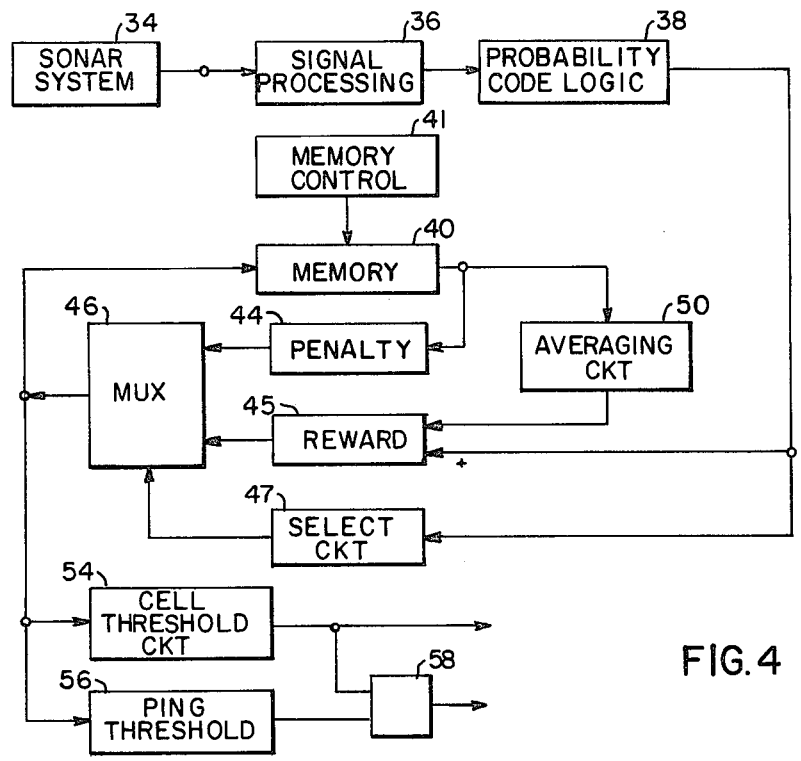
FIG. 4 is a block diagram illustrating one embodiment of the present invention.

FIG. 4 illustrates in block diagram form one embodiment of the present invention for use with a side looking sonar system 34 which provides the repetitive line scanned signals indicative of a target area. The signals are examined by signal processing circuit 36 for determining the presence of certain predetermined parameters whereby the probability code logic circuit 38 will provide a weighted output signal dependent upon the number of parameters present. A memory 40 whose operation is governed by memory control circuit 41 receives the results of the examination and means are provided for relatively increasing or decreasing the stored results of one examination as a function of the weighted output signal from a subsequent examination.

This is accomplished with the provision of penalty circuit 44 which decreases the stored value by a predetermined amount if the weighted output signal is zero, and a reward circuit 45 which increases the stored amount if the weighted output signal is greater than zero.

The selection of the rearward or penalty for writing back into the memory 40 is accomplished with the provision of multiplex switch 46 and select circuit 47, which receives the weighted output signal from the probability code logic circuit 38. In the reward mode of operation, an approximate average of a portion of the previously stored signal is added to the new code with the provision of averging circuit 50 in order to maintain a ping-to-ping correlation on targets which are not parallel to the direction of transducer movement and thus would not be in the same position from signal to signal.

The values written into memory at particular storage locations are compared in circuit 54 with a predetermined threshold and if the memory value is greater than that threshold, a possible target indication is made. In order to be able to provide an indication of a possible long narrow target lying at an angle almost perpendicular to the direction of carrier travel, a second threshold circuit 56 is provided and which accumulates all of the numbers to be stored in memory for a ping and a threshold is applied to the summation. Any output signals from threshold circuits 54 and 56 are provided to target indicator circuit 58 which may be utilized to alert the operator for the presence of a possible target such as by audio or visual means and in addition, these signals may be utilized to appropriately mark the display.

Figure 5:
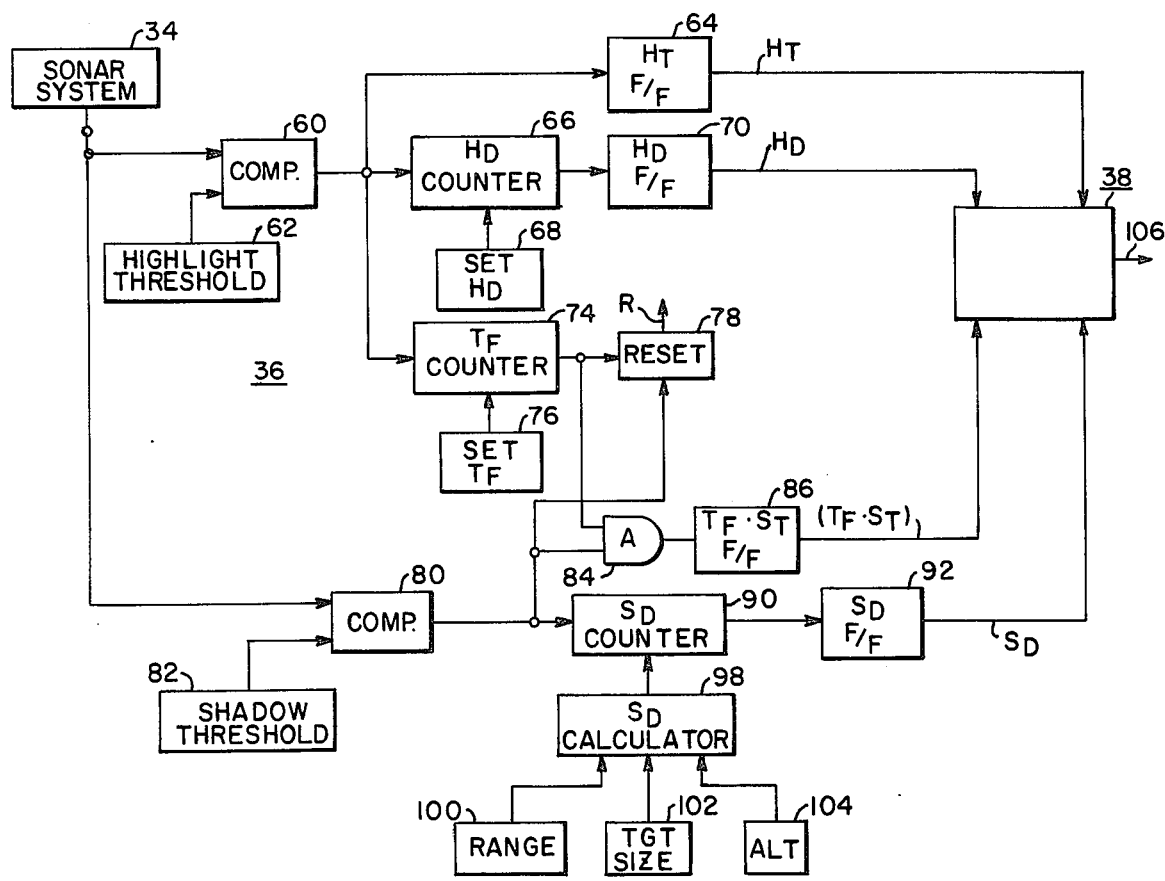
FIG. 5 is a block diagram illustrating the signal processing circuitry of FIG. 4 in more detail.

FIG. 5 illustrates in block diagram form one embodiment of the signal processing circuitry 36 of FIG. 4. The sonar system 34 provides the repetitive line scanned signals indicative of a target area and by way of example these signals may be normalized and in digital form.

Various predetermined parameters of the input signals may be examined; but the present invention is described with respect to the examination of a signal for highlight amplitude, highlight duration, condition that a shadow must follow a highlight, shadow threshold, shadow duration and ping-to-ping correlation.

With respect to the highlight parameters, the signal processing circuitry includes a comparator 60 which receives an input signal from the sonar system 34 and compares its amplitude, during successive range cell intervals, with a predetermined threshold provided by highlight threshold circuit 62. If, for a particular range cell, the input signal is greater than the predetermined threshold, comparator circuit 60 will provide an output signal to place highlight threshold flip-flop 64 into a set condition whereby it will provide an output signal to the probability code logic circuit 38, and will continue to provide such signal until reset.

The comparator output is also provided to a circuit means for determining the duration of the highlight and this circuit means includes the highlight duration counter 66 which is clocked each range cell and will provide an output signal if the highlight indication is present over a predetermined number of range cells governed by the highlight duration counter set circuit 68. If counter 66 does provide an output signal indicating that the highlight has been present for a predetermined duration, it will set the highlight duration flip-flop 70 which in turn will provide an output signal, until reset, to circuit 38.

In the present example one of the conditions for indicating a possible target is that a shadow appear within a predetermined number of range cells after termination of a highlight indication. Accordingly, counter 74 is provided and is responsive to the termination of an output signal from comparator 60 to provide an output signal for a duration of time governed by the fall time set circuit 76. That is, fall time counter 74 will provide an output signal for a predetermined number of range cells past the end of the highlight; and the shadow, if any, must occur before this fall time counter signal disappear. If the signal does disappear before any shadow indication occurs, then reset circuit 78 will reset all of the flip-flops providing output signals to probability code logic circuit 38.

In order to detect a shadow in the input signal, there is provided comparator circuit 80 which receives an input signal from the sonar system 34 and compares the signal amplitude during successive range cell intervals with a predetermined threshold provided by shadow threshold circuit 82. If the signal falls below this shadow threshold, comparator circuit 80 will provide an output signal. This output signal indicative of the shadow however must occur during the predetermined fall time after a highlight, otherwise reset circuit 78 provide its reset output signal. If the shadow does occur within the prerequisite number of range cells after termination of the highlight, AND gate 84 will receive not only the shadow indication signal from comparator 80 but an enabling signal from fall time counter 74 to in turn place flip-flop 86 into a set condition so that the output signal therefrom to circuit 38 is indicative of two conditions being met, mainly the occurrence of a valid shadow and its occurrence within a predetermined time period after a highlight.

Figure 6:
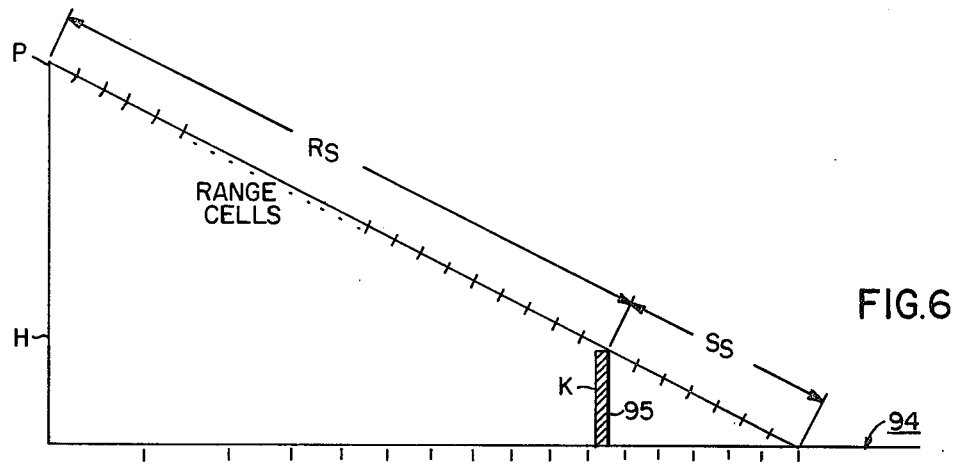
FIG. 6 is a diagram illustrating certain measurements utilized therein.

The last parameter to be examined, shadow duration, is accomplished with the provision of a shadow duration counter 90 which will provide an output signal to place the shadow duration flip-flop 92 into a set condition if the shadow indication signal from comparator 80 exceeds a certain time duration. The target shadow however is a function of the range to the target, as illustrated in FIG. 6, to which reference is now made.

Let it be assumed that the apparatus at point P is at an altitude H above the target area 94. Target 95 has a height K. The slant range to the target is $R_S$ with the slant shadow range being $S_S$. As is well known to those skilled in the art, a master oscillator may provide an output signal corresponding to bottom range cells or if desired, slant range cells. The geometry of FIG. 6 is predicated upon slant range cells. From a geometric consideration:

$$S_S = \frac{KR_S}{H - K} \quad (1)$$

It is a good assumption that target height is small compared to the transducer altitude, therefore H-K can be replaced by H and the equation becomes:

$$S_S = \frac{KR_S}{H} \quad (2)$$

Accordingly, and with reference back to FIG. 5, the shadow duration counter 90 is set, as was the highlight duration counter 66, except that it is set to provide its output signal as a function of side looking sonar altitude, (H) target size (K) and range ($R_S$). To accomplish this, a shadow duration calculator 98 is provided to perform the calculation of equation (2). Inputs to the shadow duration calculator 98 include one from the range circuit 100, which may be the system range counter, an input from the target size circuit 102, which may be a settable switch, and a third input from the altitude circuit 104, such altitude indication being provided in any one of a number of well known ways. Therefore with a constant altitude and a chosen minimum size to be detected, the shadow signal input to shadow duration counter 90 will have to be of greater and greater duration proportional to the increasing range count of circuit 100.

In operation thereof if only a highlight is present, only highlight threshold flip-flop 64 will provide an output signal. If the highlight is present and is present for a predetermined number of range cells (1 or more) then highlight duration flip-flop 70 will additionally be placed into a set condition. If a shadow then occurs in a prerequisite period of time after a highlight then flip-flop 86 will provide an output signal and if the shadow lasts for a certain period of time proportional to the target range, then the shadow duration flip-flop 92 will be placed into a set condition. When the signal rises above the shadow threshold, reset circuit 78 is operable to reset all four flip-flops 64, 70, 86 and 92.

The parameter indications are provided to the probability code logic circuit 38 which provides a weighted output signal on line 106 as a function of the number of parameters present. One way of accomplishing this with digital signal processing is by arranging the four parameters $H_T$ $H_D$ ($T_F \cdot S_T$) and $S_D$ to form six mutually exclusive equations to provide code values, with the equations being arranged so that the higher the code value, the more target like characteristics the input signal must possess in order for the equation to be true. In other words, the higher the number, the more probable it is that the current range cell is part of a target. The following mutually exclusive equations are performed by the indicated AND circuits of FIG. 7.

| EQUATION | VALUE | AND GATE |
|---|---|---|
| $\overline{H_T} \cdot \overline{H_D} \cdot \overline{(T_F \cdot S_T)} \cdot \overline{S_D}$ | = 1 | 110 |
| $H_T \cdot \overline{H_D} \cdot \overline{(T_F \cdot S_T)} \cdot \overline{S_D}$ | = 2 | 111 |
| $H_T \cdot \overline{H_D} \cdot (T_F \cdot S_T) \cdot \overline{S_D}$ | = 4 | 112 |
| $H_T \cdot \overline{H_D} \cdot (T_F \cdot S_T) \cdot \overline{S_D}$ | = 8 | 113 |
| $H_T \cdot \overline{H_D} \cdot (T_F \cdot S_T) \cdot S_D$ | = 16 | 114 |
| $H_T \cdot H_D \cdot (T_F \cdot S_T) \cdot S_D$ | = 32 | 115 |

If the outputs from the respective AND gates are considered equivalent to binary positions with AND gate 110 providing at least significant bit and AND gate 115 providing a most significant bit then the combination of input signals will provide a unique output signal on one and only one of the respective output leads 116 through 121. Thus if only a highlight threshold is present AND gate 110 will provide an output signal on lead 116 indicative of the value 1. If the highlight is present for the predetermined time period then AND gate 111 will provide an output signal on lead 117 indicative of the value 2. If a highlight is present and a shadow appears in the prerequisite period of time, AND gate 112 will provide an output signal on lead 118 indicative of the value 4. If all parameters are present except for the shadow duration being exceeded, then AND gate 113 will provide an output signal on lead 119 indicative of the value 8. If all parameters are present except the highlight for its prerequisite period of time, then AND gate 114 will provide an output signal on lead 120 indicative of the value 16. If all parameters are present AND gate 115 will provide an output signal on lead 121 indicative of the value 32.

Figure 8:
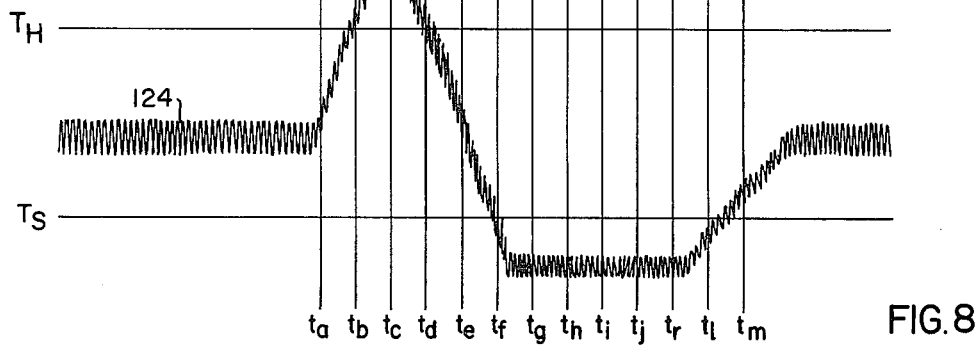
FIG. 8 illustrates a portion of a side looking sonar signal.

For example, and with reference to FIG. 8, waveform 124 is an idealized representation of a typical side looking sonar signal (RMS value). Time periods $t_a \ldots t_m$ below the waveform represent consecutive range cells and the code value for each range cell is given above the waveform. At time $t_a$, waveform 124 is at the zero or reverberation level and starts to rise toward the highlight threshold level $T_H$. Since none of the parameters are present, the output signal on line 106 from the probability code logic circuit 38 would be zero. For the very next range cell at time $t_b$, the threshold is exceeded, highlight threshold flip-flop 64 will be placed into a set condition and logic circuit 38 will provide a 1 value output signal. The highlight is present for the next range cell so that the highlight threshold flip-flop remains in a set condition and the output signal from circuit 38 remains a 1. If the highlight duration is set for two cells, then it is exceeded such that at times $t_d$ the highlight duration flip-flop 70 will additionally be placed into a set condition so that the output from circuit 38 will have a value of 2. At time $t_e$ for the next range cell the output remains at 2 and when the signal passes the shadow threshold $T_S$ after range cell $t_f$, flip-flop 86 will additionally provide an output signal whereby logic circuit 38 will provide an output signal of the value 8. An 8 output signal will continually be provided until the shadow duration requirement is met, for example; at the range cell corresponding to time $t_j$, at which point all parameters are present, all flip-flops are set, and a maximum value of 32 is provided by logic circuit 38. This same value of 32 will be provided for subsequent range cells until the signal rises above the shadow threshold for example at time $t_1$ at which point the flip-flops are placed into a reset condition and the output value on line 106 drops to zero.

In the present example, the values obtained for the range cells are stored at corresponding locations in a memory so that if a signal similar to waveform 124 is present in a number of received signals, the stored values for the particular range cells will be increased to a certain point whereby a possible target indication may be provided. If the output code for any particular range cell is zero, a penalty mode is selected whereby the value stored in memory for that particular range cell is decreased by a certain proportion. If the code is not zero, a reward mode is selected and the present value for the particular range cell is, by way of example, added to the average of a number of range cells adjacent the current range cell and the sum stored back into memory at the appropriate range location. This particular operation is to maintain some ping-to-ping correlation for targets which are skewed relative to the direction of travel and hence will not appear at the same range cell in each ping. FIG. 9 illustrating a portion of FIG. 4 in more detail, accomplishes the storage and the relative increasing or decreasing of the stored values depending upon the weighted output signal.

Memory 40 includes a random access memory (RAM) 130 for storage of range cell values at range cell locations addressable by means of memory control unit 41. The output of RAM 130 is provided to a shift register section 132 which is clocked at the range cell rate and which includes a number of stages. In operation an average of eight adjacent range cells (±4 cells) is taken. Accordingly, the shift register 132 may include a number of stages to encompass this 9 cell range window (one cell under investigation plus four range cells on either side). Thus the shift register may include stages $Q_1$ to $Q_9$ with the middle stage $Q_5$ having stored therein the current range cell. Stages $Q_6$ to $Q_9$ therefore will have the values of the previous 4 range cells and stages $Q_4$ to $Q_1$ will have the values of the subsequent 4 range cells. Stage $Q_0$ receives the output of the addressed RAM and represents the value which will go into the range window while stage $Q_9$ represents the value which will go out of the range window. These values are differentially added in summation circuit 134 and the difference $Q_0 - Q_9$ is algebraically accumulated, the result of the accumulation being a summation of all the numbers in the shift register. That is, as a new number enters the range window, its value is added and the value of the number leaving is subtracted. The accumulation is accomplished with the provision of a summation circuit 136 which receives the output value from summation circuit 134 and adds it to its output obtained from holding register 138.

A predetermined function of the summation is obtained and added to the current code to form the reward. Any predetermined function may be chosen and by way of example the output from summation circuit 136 may be averaged by provision of circuit 140. Summation circuit 142 which may constitute the reward circuit 45 of FIG. 4, receives the current code on line 106 and the averaged summation from circuit 140 to provide one input to multiplex unit 46.

Figure 7:
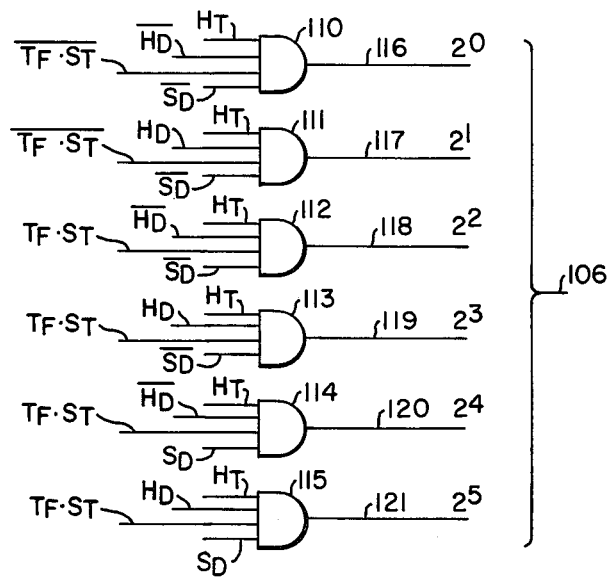
FIG. 7 is a logic diagram illustrating the probability code logic circuitry of FIG. 4.

The other input to multiplex unit 46 is obtained by taking a predetermined portion of the current range cell. For example, the current range value stored in stage $Q_5$ may be multiplied by three-fourths as a penalty and applied to the multiplex unit 46 which will then pass back to memory either the penalized signal or the rewarded signal dependent upon the value appearing on line 106. Select circuit 47 includes an OR gate 144 which will provide an output signal whenever a signal is present on any one of the leads 116 to 121 (FIG. 7). If a signal is present, AND gating circuits 146 will be enabled and the reward signal will be provided to the memory through OR gating circuits 148. The output signal provided by OR gate 144 is inverted by inverter 150 such that AND gating circuits 152 will not be enabled.

If the new target code is zero, OR gate 144 will provide a zero output signal which when inverted by inverter 150 will enable AND gates 152 such that the penalized signal is placed back into memory at a cell location corresponding to that location from which the value in $Q_5$ was obtained.

Since any value read out of RAM 130 takes five range cell times to reach stage $Q_5$, the memory address for writing back into RAM 130 must be decremented by five to get back to the proper target cell location. This operation is illustrated by the waveforms of FIGS. 10A through 10D.

FIG. 10A represents the range clock pulses being provided at times $t_a$, $t_b$, $t_c$, etc. Waveform 10B represents the subtract 5 signal generated in memory control unit 41 while FIG. 10C represents the address provided by memory control unit 41. The waveform 10D represents the read/write cycle also provided by memory control unit 41.

Examining the time between successive range clock pulses from $t_a$ to $t_b$, let it be assumed that the memory is being addressed at range cell location N from time $t_a$ to $t_1$. At time $t_1$, the subtract five waveform modifies the address such that the RAM address is decremented by five as illustrated in FIG. 10C. During this time period, beginning at time $t_2$, a write enable is provided so that the output from multiplex unit 46 may be written into range cell location N-5. The write pulse lasts until time $t_3$, and at time $t_4$ the subtract five waveform goes to zero and the addressing then jumps back to the original address N. This same operation is repeated between successive range cell intervals such that at time $t_b$ the range cell location N+1 is addressed at which time its value goes into stage $Q_0$ of shift register 132, after which the addressing is decremented by five to address location N-4 whereby the new penalized or rewarded value may be written back to its proper location. After reverting back to address N+1, the address will be incremented by 1 to N+2 beginning at time $t_c$ after which the process continues.

In one mode of operation, the last few range cells may be averaged with the first few range cells which in general will contain no information.

Referring back to FIG. 9, the number being stored into the memory, either the reward or penalty, is compared with a predetermined threshold which, if exceeded, will provide an indication of a possible target.

Thus circuit 54 includes a comparator 155 which receives the output from multiplex unit 46 in addition to a predetermined threshold setting from cell threshold circuit 157 to provide a target indication signal on output line 158 to target indication circuit 58.

If a long target exists and is nearly perpendicular to the direction of travel of the apparatus, there will be provided a long series of highlights, that is many one and two code values. In such case no one cell will build up to a high enough threshold, however it still may be desired to indicate such a target. The circuit 56 is provided for this purpose and includes an accumulator 160 which sums all of the numbers going into memory and compares this summation with a threshold provided by ping threshold circuit 162 in comparator 163.

Any output on line 164 will cause the target indicator circuit 58 to take appropriate action. Many possibilities exist for the action to be taken by the target indicator circuit 58 such as an audio or visual signal to alert an operator and/or by suitably marking the display either in the margin thereof or by generating a cursor around the general vicinity of the target.

Although the actual target may precede the target indication by a number of range cells, (since the higher valued range cells occur at the end of the target shadow) a general indication of a target will suffice for most purposes.

Although the term side looking energy or side looking sonar is utilized herein such terms are generic to include for example angle looking or forward looking systems, in general, any system where energy scans from adjacent narrow strips are displayed as a function of time corresponding to range.

We claim:
1. Automatic target detection apparatus comprising:
   a. means providing a plurality of repetitive line scanned signals indicative of a target area of interest;
   b. each said signal having an amplitude as a function of range, with said range being divided into a predetermined plurality of successive range cells so that there is a particular value of signal amplitude corresponding to a particular range cell;
   c. storage means having a plurality of storage locations corresponding to said range cells;
   d. means for examining said signals in successive time periods, each corresponding to a range cell, for determining the presence of a plurality of predetermined parameters in said signal and providing for each said time period corresponding to a range cell, a weighted output signal dependent upon the number and combination of said parameters present;
   e. means for storing values, as a function of said weighted output signal, in corresponding range cell storage locations in said storage means; and
   f. means for relatively increasing or decreasing a stored value from one said examination depending upon said weighted output signal from a subsequent examination.
2. Apparatus according to claim 1 wherein:
   a. the already stored value for a particular range cell is decreased in value if said weighted output signal for that particular range cell is below a certain value.
3. Apparatus according to claim 1 wherein:
   a. the already stored value for a particular range cell is decreased in value if said weighted output signal for that particular range cell is zero.
4. Apparatus according to claim 1 wherein:
   a. the already stored value for a particular range cell is increased in value if said weighted output signal is above a certain value.
5. Apparatus according to claim 1 which includes:
   a. means for providing both an increased stored value and a decreased stored value for a particular range cell; and
   b. means for placing only one of said increased or decreased values back into a storage location corresponding to said particular range cell.
6. Apparatus according to claim 5 wherein:
   a. said decreased value is placed back into said storage location if said weighted output signal is zero and said increased value is placed back, if said weighted output signal is > 0.
7. Apparatus according to claim 1 which includes:
   a. means for comparing said values placed into said storage means with a predetermined threshold; and
   b. means for indicating a possible target if said threshold is exceeded.
8. Apparatus according to claim 1 which includes:
   a. means for accumulating said values placed into said storage for one said signal and comparing said accumulated value with a predetermined threshold; and
   b. means for indicating a possible target if said threshold is exceeded.
9. Apparatus according to claim 1 wherein said means for examining includes:
   a. a plurality of parameter flip-flops;
   b. means for sequentially setting said flip-flops in accordance with the occurrence of said parameters; and
   c. means responsive to the outputs of said parameter flip-flops for providing said weighted output signal as a function of the number and combination of said parameter flip-flops in a set condition.
10. Apparatus according to claim 9 wherein:
    a said parameters include
       i. a signal level above a first predetermined threshold (highlight);
       ii. a signal level below a second predetermined threshold (shadow) following said highlight within a predetermined time after termination of said highlight; and which includes
    b. means for resetting said parameter flip-flops if said shadow does not occur within said predetermined time.
11. Apparatus according to claim 10 wherein:
    a. said means for resetting resets said parameter flip-flops when said signal level rises above said second predetermined threshold.
12. Apparatus according to claim 4 which includes:
    a. means for obtaining a value which is a function of the values stored within a predetermined range window encompassing said particular range cell; and
    b. means for adding said obtained value to said weighted output signal.
13. Apparatus according to claim 12 which includes:
    a. means for addressing said storage locations operable to decrement its current address by a predetermined amount to allow the writing back of a value into its proper range cell equivalent storage location.

* * * * *